A. G. HAGUE.
CORRUGATED METAL CULVERT.
APPLICATION FILED DEC. 16, 1907.
942,256.
Patented Dec. 7, 1909.
2 SHEETS—SHEET 2.
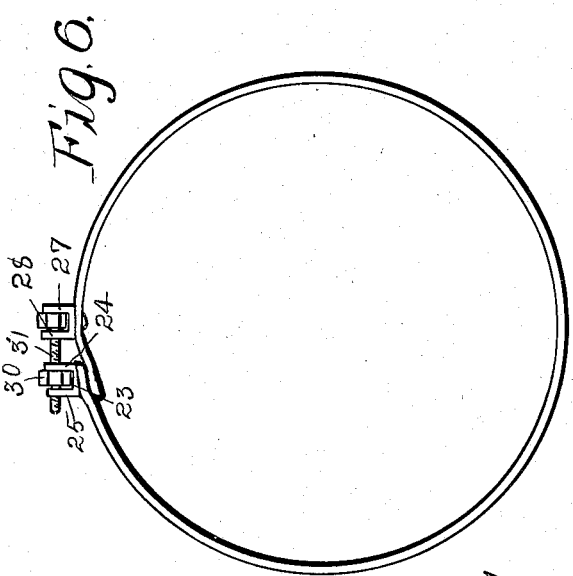
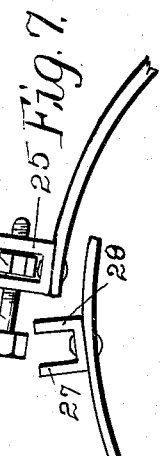
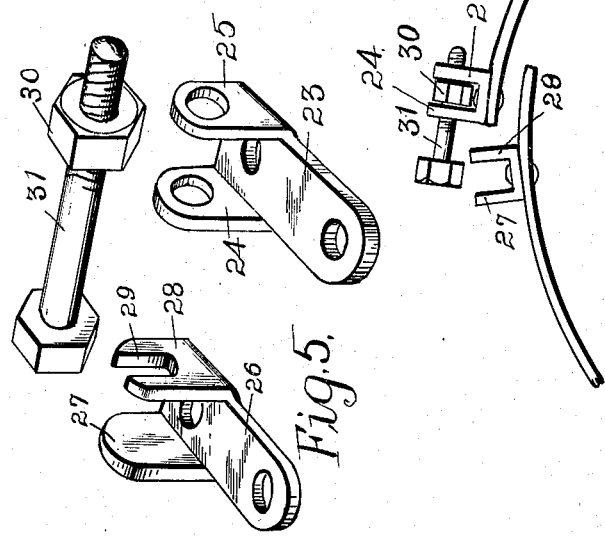
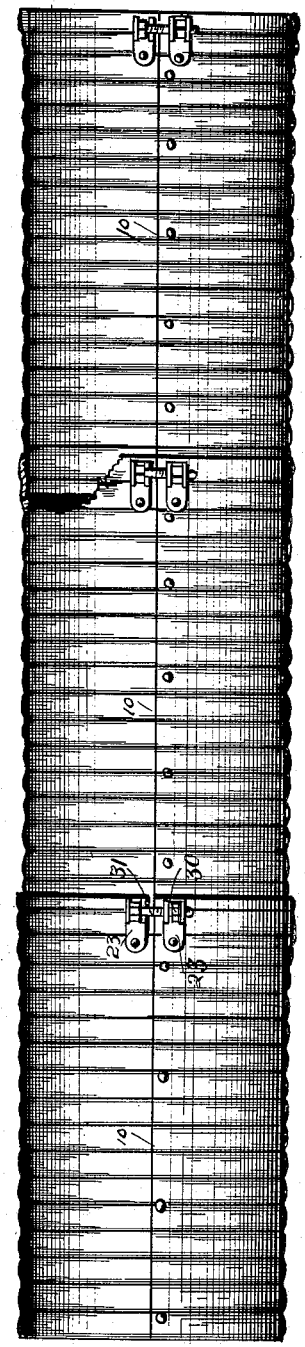
Witnesses.
Harry F. Rueth
G. M. Copenhaver
Inventor
A. G. Hague
by William D. Dean atty.

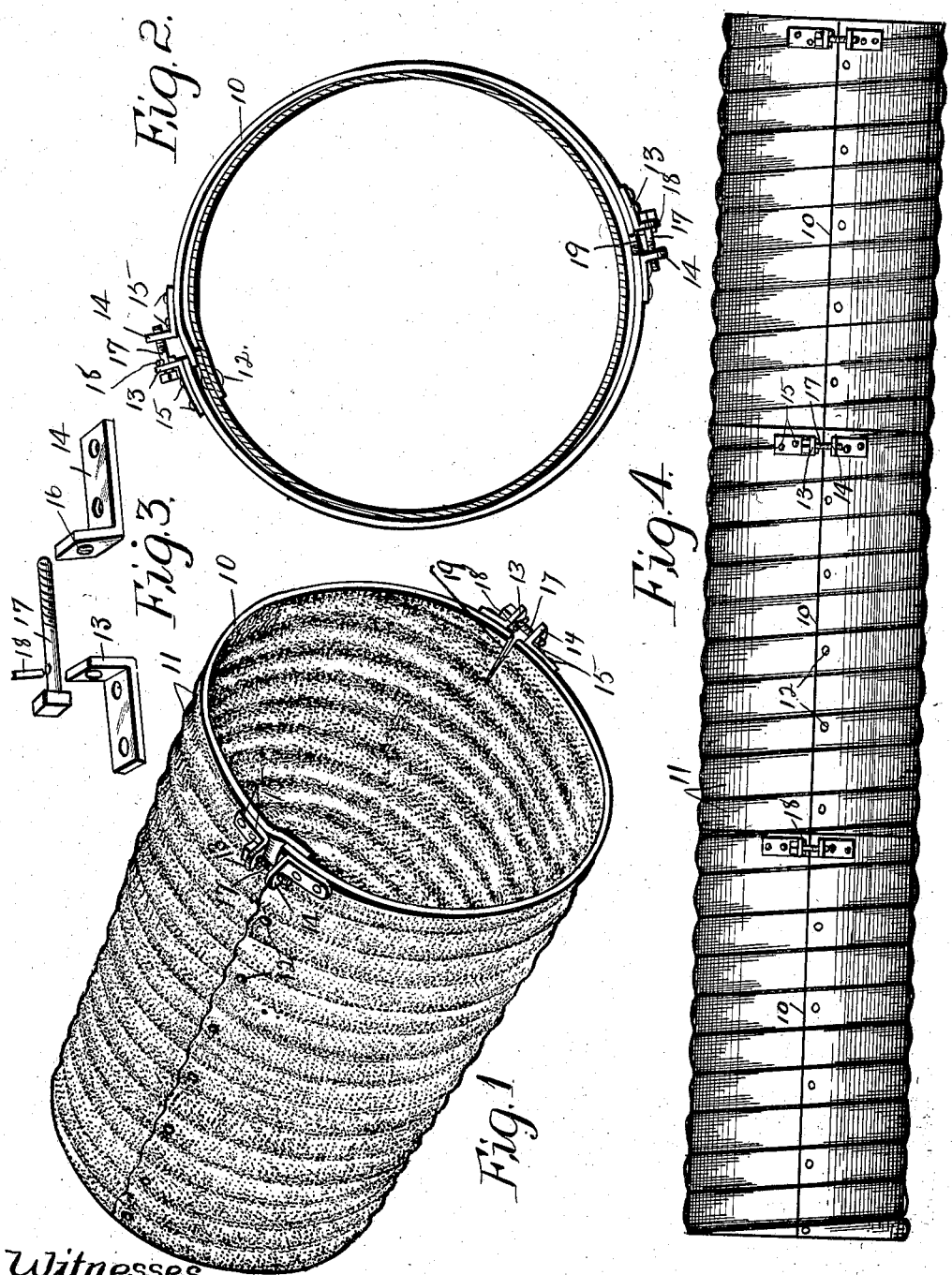

UNITED STATES PATENT OFFICE.

ALFRED G. HAGUE, OF DES MOINES, IOWA.

CORRUGATED-METAL CULVERT.

942,256.　　　　　Specification of Letters Patent.　　Patented Dec. 7, 1909.

Application filed December 16, 1907. Serial No. 406,713.

*To all whom it may concern:*

Be it known that I, ALFRED G. HAGUE, a citizen of the United States, residing at Des Moines, in the county of Polk and State of Iowa, have invented a new and useful Corrugated-Metal Culvert, of which the following is a specification.

My invention relates to that class of sheet metal culverts which are manufactured, sold and shipped in short sections, which sections are designed to be put together by unskilled workmen in the ditches or trenches in which they are to be used.

My object is to provide a culvert of this kind formed of sheet metal sections having corrugations therein for the purpose of strengthening and reinforcing the sections, and also for the purpose of enabling the operator to quickly and easily fit two sections together in such manner that when fitted, they will be firmly and immovably held together.

A further object is to provide simple, durable, and inexpensive means to be permanently attached to one end of each section, whereby the operator may quickly and easily before connecting two sections, operate said device to spread the end of the section to which the device is attached, so that the end of a mating section may be readily and easily admitted in said spread end, and then after the sections are so connected, the operator may also quickly and easily contract the spread end so as to firmly clamp it to the end of the section admitted therein.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a perspective view of a culvert section embodying my invention. Fig. 2 shows an end view of same, with a mating section inserted in the spread end, the latter being shown in section. Fig. 3 shows a detail perspective view of the device for spreading and contracting the culvert sections, the parts of said device being separated from each other. Fig. 4 shows a top or plan view of a number of sheet metal culvert sections embodying my invention connected together, as in use. Fig. 5 shows an enlarged detail perspective view of a modified form of the spreading and contracting device. Fig. 6 shows an end view of a culvert section having the modified form of spreading and contracting device applied thereto. Fig. 7 shows an enlarged detail view of the overlapping portions of a culvert section with the modified form of spreading and contracting device applied thereto, the bolt head of said device being shown separated from the lugs designed to receive it, and Fig. 8 shows a top or plan view of a number of corrugated sheet metal culvert sections embodying my invention, and provided with the modified form of spreading and contracting device.

Referring to the accompanying drawings, it will be seen that each section of the form of my invention illustrated in Figs. 1 and 4, is formed complete of a single piece of sheet metal 10, which is formed with spiral corrugations 11 extending from one end to the other. These corrugations are preferably formed by means of suitable rollers or formers applied to the metal before it is formed into a tube. After the corrugations are formed, the edges are placed in overlapping positions, and connected by rivets or bolts 12. At one end of each section, which I have termed the "spread end", I either space the rivets or bolts 12 a considerable distance from the end, or else detachably place them in position so that they can be easily removed and replaced.

In order to provide for separating and drawing together the edges of the metal at the spread end, I attach to one edge near the spread end a lug 13, and to the other edge a lug 14. These lugs are permanently connected with the culvert by bolts or rivets 15. The lug 14 preferably has a screw threaded opening 16 extending through it, designed to receive a bolt 17, through which a pin 18 is passed on the inside of the lug 13, so that the screw threaded portion of the bolt 17 will enter the screw threaded opening in the lug 14, and as the bolt is turned in one direction, the lugs, together with the parts to which they are attached, will be spread by the pin 18 and the screw threaded end of the bolt, and when turned in the other direction, the lugs will be brought together by the bolt head and its screw threaded end, so that the person securing one section to the other may do so readily by opening the spread end of the section sufficiently to admit of the adjacent end of the next section, and so that when two sections are connected, the operator may readily and quickly clamp the spread end to the other by manipulation of the bolt. By the use of the bolt 17 provided with the pin 18, it is obvious that the bolt may be readily, quickly and easily detached from the lug 13 whenever desired, and if for any reason, the bolt should have its threads stripped off or should be broken or bent, a new one can readily and easily be substituted for it. Furthermore, bolts of different lengths may be quickly and easily applied to suit the requirements of actual use.

The opening in the lug 13 is made large enough to permit the bolt 17 to tilt slightly, and hence enable the bolt to be screwed into the screw threaded opening of the lug 14 readily, even though the parts may be separated somewhat, and so the lugs may be attached to a culvert of very small diameter.

In practical use, the culvert sections are preferably manufactured complete with the bolts or rivets 12 in position, save that the last two or three bolts or rivets may be left out to be inserted when the spread end has been drawn to its closed position by the lugs upon it. The lugs 13 and 14 are preferably secured at the time of manufacture to the spread end of the section, and the bolt 17 placed in position as shown in Fig. 6 of the drawings. The culverts are preferably shipped in sections so that a minimum amount of space will be occupied in the car in which they are packed, and so that they may be easily moved from one place to another.

In order to connect the sections together, the operator places one section upon the ground with its spread end in position to receive the opposite end of a mating section, which mating section he turns relative to the section upon the ground sufficiently to screw the sections partially together and sufficiently to retain them in position relative to each other. The spiral corrugations of the sections form screw threads for this purpose. If difficulty is experienced in screwing one section to another in the manner designated, the spread end is opened wider by turning the bolt 17 in the proper direction to accomplish this result. This obviates any difficulty in screwing the sections together. When one section has been screwed into the other far enough, the bolt 17 is turned in the opposite direction from that just mentioned, and the spread end is thereby contracted sufficiently to firmly and immovably hold the sections together and form a substantially water-tight joint, and if the bolts or rivets 12 have been left out of the spread end, these can be easily replaced at this time. The advantages of this construction are obvious, owing to the fact that in shipping one section may be slightly bent, and by the construction referred to, the screw thread will not be seriously affected by any slight bend owing to the adjustment of the parts of the spread end above referred to.

In the modified form illustrated in Figs. 1 and 2, I have formed in the spread end of each section a longitudinal notch 19 at the side opposite from the overlapping edges, and I have also provided lugs 13 and 14 and a bolt 17 to be used on opposite sides of said notch in the same manner as the lugs 13 and 14, and the bolt 17 before described. The object of this modification is that the end may be spread more readily and somewhat wider than is possible without the notch 19, and also it may be tightened upon the section inserted in it more firmly, because of the two bolts at diametrically opposite sides.

In the modified form shown in Figs. 5 and 8, I have shown metal culvert sections provided with circumferential corrugations running at right angles to the culvert sections, and I have also illustrated a modified form of device for spreading and contracting the spread end of each section as follows: On one of the edges of the spread end I have fixed a plate 23 having two lugs 24 and 25 thereon spaced apart, provided with bolt openings in line with each other, and on the adjacent edge I have placed a similar plate 26 with two lugs 27 and 28. The lug 27 is not provided with an opening and the lug 28 is provided with a notch 29 open at its top. A nut 30 is inserted between the lugs 24 and 25 and a bolt 31 is extended through the openings in the lugs 24 and 25 and through the nut 30, the head of the bolt being designed to enter between the lugs 27 and 28, the notch 29 being provided to receive the body of the bolt and permit it to stand in line with the openings in the lugs 24 and 25 when its head is between the lugs 27 and 28. The bolt 31 is of the ordinary construction and is readily and easily detached from the lugs. By this means bolts of various sizes may be readily and easily substituted to suit the requirements of actual use. With this form of the invention, and assuming that the culvert sections are made of uniform diameter throughout, then when the operator desires to connect two sections together, he first manipulates the head of the bolt 31 in a direction tending to force the head against the lug 27, and thus spread the plates 23 and 26 apart, thereby spreading the end of the culvert section. This operation is continued until the spread end is separated far enough to permit the admission of the mating end of another section, then the operator turns the bolt head in the opposite direction, thereby causing it to engage the lug 28 and move the plates 23 and 26 toward each other until the spread end of the culvert section is firmly clamped to the section inserted in it. By having the culvert sections corrugated as shown, it is obvious that when the spread end is thus clamped upon the section inserted in it, a joint is made which is firm and immovable and which is practically water-tight.

A material advantage gained by the construction shown, is that it enables the operator to rigidly hold the two sections together, and thus form a tight fitting joint between them.

By providing means for spreading and contracting the end of a sheet metal section culvert, I attain several advantageous results: The sections may be made of uniform size throughout and shipped to the point where they are to be used, in this way, thus saving the expenses attendant upon the spreading of the ends before shipment. Then when it is desired to connect two sections together, the operator may readily and quickly spread one end of each section just as far as may be necessary to receive the adjacent end of another section, and by means of this spreading movement, the mating section may be placed in the spread end very quickly and easily, and without the use of tools. In this connection, it is to be understood that these sheet metal sections are often transported a great distance, and subjected to very severe handling, and hence, the ends of the sections are seldom perfectly round when delivered at the ditch or trench in which they are to be used, therefore, it would be impracticable to make the opposite ends of such shape that one would exactly fit into the other, and form a tight joint when they are fitted, because if one end was bent out of true, then the unskilled workmen in the ditch or trench would not be able to screw the two sections together, hence, it is necessary that one end be spread far enough to loosely receive the mating end of another section, so that the operators may quickly and easily secure the two sections together without tools, and then tightly clamp them with the use of an ordinary wrench. Furthermore, it would not be practicable to leave one end spread, because a substantially water-tight joint would not be thereby formed. Hence, by providing means for drawing the spread ends together after another section has been inserted therein, I accomplish the purpose of providing a tight joint that cannot be detached until the bolt is released, so that two sections are firmly and immovably held together without bolts or similar devices passed through the sheet metal.

I claim—

1. An improved corrugated culvert, comprising a section formed of sheet metal and of cylindrical shape, said culvert being divided longitudinally at two diametrically opposite points, and an adjusting means at each of said divided portions, each adjusting means comprising two lugs secured to adjacent portions of the culvert, and a bolt detachably connected with said lugs, said parts being so arranged that when the bolt is moved in one direction the adjacent edges will be spread apart, and when moved in the other direction the adjacent edges will be drawn together.

2. An improved corrugated culvert, comprising a cylindrical sheet metal body portion with its longitudinal edges in overlapping positions, a lug fixed to one edge, said lug having two upright portions, one of the upright portions being slotted, the other lug having two upright portions both of which are provided with openings, a nut arranged between the two latter upright portions, and a bolt extended through said openings and through said nut and having its head arranged between the two upright portions of the first mentioned lug with the body portion of the bolt inserted in said slot.

3. An improved culvert, comprising a sheet metal body portion provided with spiral corrugations throughout its length, the longitudinal edges of said culvert being in overlapping positions, and means for adjusting said overlapping edges at the end as required to spread the end or contract it.

4. An improved culvert, comprising a sheet metal body portion provided with spiral corrugations throughout its length, the longitudinal edges of said culvert being in overlapping positions, and means for adjusting said overlapping edges at the end as required to spread the end or contract it, said means comprising lugs, and a bolt that is detachable from the lugs.

5. A culvert comprising a body portion formed of a single sheet of metal of cylindrical shape, with its edges in overlapping position and secured together, spiral corrugations formed on the end portions thereof, one end being capable of spreading at the point where the edges overlap, said end being also provided with a longitudinal notch at the side opposite from the overlapping edges.

6. A culvert comprising a body portion formed of a single sheet of metal of cylindrical shape, with its edges in overlapping position and secured together, spiral corrugations formed on the end portions thereof, one end being capable of spreading at the point where the edges overlap, said end being also provided with a longitudinal notch at the side opposite from the overlapping edges, lugs secured to the spread end on opposite sides of said notch, and bolts passed through said lugs.

7. A culvert comprising a body portion made of a single piece of sheet metal formed cylindrical, with the overlapping edges connected together, said culvert being formed with spiral corrugations throughout its length, one end of said culvert being capable of spreading at the overlapping edges, and also formed with a notch at the opposite side, and clamping devices applied to the culvert at said overlapping edges, and at said notch, for the purposes stated.

Des Moines, Iowa, Dec. 14, 1907.

ALFRED G. HAGUE.

Witnesses:
SIDNEY F. CHRISTY,
M. E. BENNETT.